May 21, 1968 C. GAZAL 3,383,973
AXIAL-STRESS LIMITING DEVICE
Filed June 22, 1965 2 Sheets-Sheet 1

INVENTOR
CHARLES GAZAL
BY Bacon & Thomas
ATTORNEYS

United States Patent Office 3,383,973
Patented May 21, 1968

3,383,973
AXIAL-STRESS LIMITING DEVICE
Charles Gazal, Chatillon-sous-Bagneux, France, assignor to Commissariat à l'Energie Atomique, Paris, France
Filed June 22, 1965, Ser. No. 465,935
Claims priority, application France, July 1, 1964, 980,306
10 Claims. (Cl. 85—62)

ABSTRACT OF THE DISCLOSURE

A threaded nut, which upon rotation is adapted to impart axial movement to a threaded screw, is mounted on a fixed body for rotative and limited axial movement. A stack of dished, spring washers, calibrated to withstand a stress of a predetermined value before yielding, is positioned between the fixed body and the nut and urge one end of the nut against the body. The other end of the nut is provided with teeth which are interengageable with opposed teeth provided on an abutment member for locking the nut to the fixed body. The abutment member is adjustably mounted in the body by means of coarse-pitch threads, the pitch of which extend in the opposite direction to the pitch of the threads on the nut. Lugs, which are formed on the upper end of the abutment member, rotate between projections formed on the body and a spring acting between the body and the abutment member acts to rotate said member to move it axially upwardly away from the nut. A rod for rotating the nut extends through the abutment member. The axial stress imparted to the screw upon rotation of the nut in a direction to impart reaction forces to the nut tending to compress the stack of washers, is limited to the calibrated value of the washer stack since additional stress moves the nut upwardly and the teeth on the nut into locking engagement with the teeth on the abutment member thus preventing further rotation of the nut and further stress to the screw.

---

The present invention relates to an axial-stress limiting device which is particularly designed to control the clamping stress of a screw and nut system, especially when said stress has to be repeated in a constant manner during successive operations.

It is common practice to employ for the purpose of controlling valves, for example, torque-limiting systems of various types including those which utilize friction, balls or the like, but the action of which in most instances varies progressively as the stress is repeated. This is mainly due to the variations in the coefficients of friction, the quality of lubrication, the relative humidity of the air, the temperature, the state of the surfaces or even variations between stopping and sliding motion. Moreover, variations in efficiency of the screw and nut system itself which are in turn brought about by progressive variation in conditions of surface and above all by the quality of lubrication which, in many cases, cannot be controlled, have an influence on the stress and prevent the repetition of said stress at a constant value.

The object of the present invention is to overcome the disadvantages referred to by providing a device having an action which does not depend on any frictional torque, with the result that the stress can be so regulated as to be influenced neither by the manner in which the necessary torque is applied nor by the efficiency of the screw and nut system.

This invention is accordingly directed to an axial-stress limiting device wherein the nut is mounted in a stationary support comprising means for checking the reaction stress exerted by the nut on its support and a device for securing said nut against rotation when said stress has reached a predetermined value.

According to a preferred form of embodiment, the limiting device comprises a precalibrated elastic system sensitive to the reaction stress, for controlling position of said nut and immobilising it axially as long as said stress has not reached a given value which is slightly lower than the adjustment stress of the device, and an abutment member which is capable of rotating through a predetermined angle for locking said nut when displaced by a stress exceeding elastic system stress, said abutment member being controlled by the displacement of said nut.

The clamping stress accordingly depends on the one hand on the calibration of the elastic system and on the other hand on the distance between the nut and the abutment member. No frictional torque is therefore exerted and the elastic system can readily be designed so as to permit of a large number of operations without resulting in any variation in its rigidity.

A number of other advantages and characteristics of the invention will in any case become apparent from the following description of one form of embodiment which is given by way of non-limitative example and illustrated in the accompanying drawings, wherein.

Figure 1:
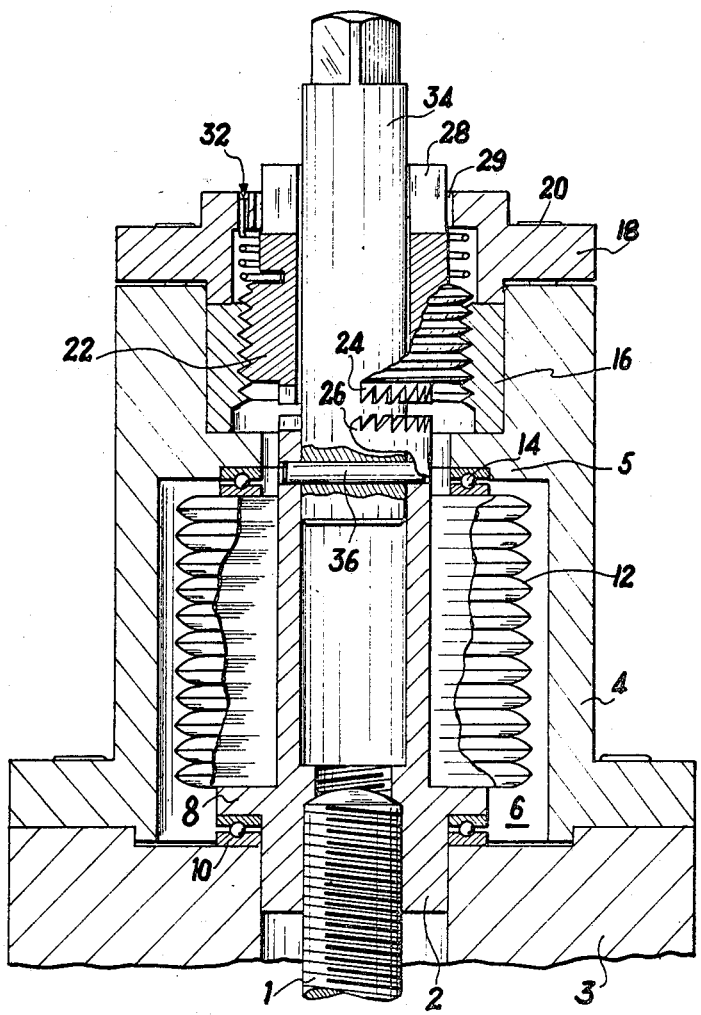
FIG. 1 shows a stress-limiting device in longitudinal cross-section.
Figure 2:
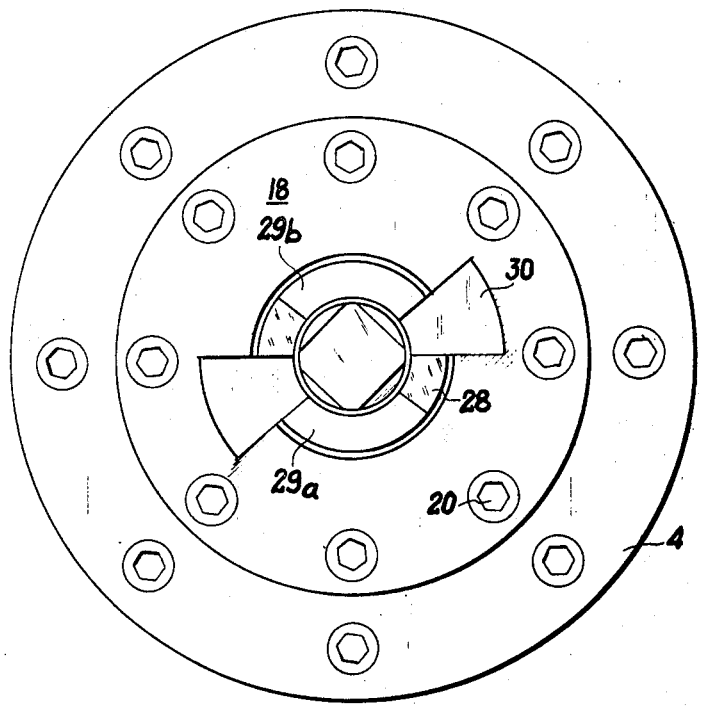
FIG. 2 is an overhead view of the stress-limiting device of FIG. 1.

The axial-stress limiting device according to the invention is mounted as shown in FIG. 1 at the extremity of a system comprising a screw 1 and nut 2 for operating a valve or like device (not shown) to which it is intended to apply a constant force during repeated operations. Said limiting device comprises a hollow cylindrical body 4 which is fixed to the body 3 of the valve or like device and which is provided with an internal shoulder 5, said shoulder being applied against the nut 2, thus delimiting with the body 3 a cavity or chamber 6 in which said nut 2 is capable of moving with a certain axial play. Said nut 2 is in fact provided at one end with a flange 8 which is applied on one side against a needle thrust-bearing 10 mounted on the body 3 and, on the other side, against an elastic system 12 consisting of a stack of washers which surrounds the nut 2 and which is in contact with a second ball thrust-bearing 14 carried by the shoulder 5.

Above said shoulder 5, the cylindrical body 4 forms a second chamber which is coaxial with the first and in which is placed an internally threaded ring 16, said ring being retained at the top by a flange 18 which is secured to the top of the body 4 by means such as screws 20. Another threaded ring 22 is screwed internally of the ring 16 and is provided at its bottom periphery with coupling dogs 24 which are preferably in the form of saw-teeth and which are designed to engage with similar dogs or teeth 26 provided on the upper extremity of the nut 2 when this latter moves towards the ring 22. The dimensions of said nut are in fact such that its external diameter is distinctly smaller than the internal diameter of the shoulder 5 and that its coupling dogs 26 are always located internally of the ring 16.

At the end opposite to the dogs 24, the threaded ring 22 is provided with lugs 28 which pass through the central opening 29 of the flange 18 and which are intended at the time of rotation of said ring 22 to come into abutment with internal projections 30 of said flange 18, thereby preventing any subsequent movement of rotation of said ring 22. A spring 32 which is mounted at one end within a recess of the flange 18 and secured at the other end to the ring 22 urges this latter into its initial position, namely the position in which said ring is separated from the nut 2.

In the form of embodiment which is illustrated in the drawings, the projecting portions 30 are two in number and the slots 29a, 29b in which the lugs 28 are designed to travel and which are also two in number correspond substantially to ⅓ of a revolution of the ring 22. As will be understood, the number and shape of said projecting portions can vary according to the freedom of rotation which it is desired to give to said ring 22, whilst the number of lugs 28 of said ring preferably corresponds to the number of slots.

The threaded ring 22 is also traversed by a rod 34 which is rigidly fixed to the nut 2 by means of a transverse locking-pin 36, said locking-pin being passed through that end of said nut which is opposite to the screw 1. Said rod 34 is operatively connected by suitable means to a driving unit for producing the movement of rotation of said nut 2.

Under the action of said driving unit, the movement of rotation of the nut 2 is accompanied by the axial displacement of the screw 1 about which said nut is mounted and also the axial displacement of the member to be brought down against its seating, for example a valve or any like device.

When the member is in contact with its seating, the rotation of the nut 2 produces on the one hand a clamping force which applies said member against its seating and, on the other hand, an axial force of reaction of the nut itself against its support, that is to say against the body 3. This last-mentioned force tends to flatten the washers 12 against the thrust-bearing 14; in point of fact, said washers have been calibrated to withstand a certain stress and, as long as the reaction does not exceed the value of calibration of the washers, the nut is secured against further axial movement relatively to said support 4. However, as the rod 34 continues to rotate and the clamping force reaches the calibration value, the flange 8 of the nut 2 begins to flatten the washers by compression and the nut moves up progressively into the upper chamber of the support 4. The nut 2 moves towards the movable ring 22 until the moment when its teeth 26 engage the teeth 24 of said ring and progressively actuate this latter. The screw-thread of the rings 16 and 22 has a coarse pitch in the direction opposite to that of the nut 2, with the result that the ring 22 tends to move towards the nut 2 when driven by this latter. However, this simultaneous movement of rotation of the members cannot last longer than one third or one sixth of a revolution, for example, that is to say, more than the distance corresponding to the length of the slots 29 between the projections 30. In fact, the lugs 28 stop all motion of the ring 22 as they come into contact with the projecting portions 30, the nut 2 is also secured against further motion and no subsequent clamping action is possible in this position.

In order to ensure good contact between the coupling dogs 24 and 26, said dogs are preferably given a saw-toothed profile so as to prevent any possibility of jamming or of axial stress. Engagement as a result of a slight movement of rotation of the nut and movable ring assembly permits the complete interlocking of the coupling dogs without thereby exerting on the mating surfaces a torque which would be liable to impair the summits of the teeth upon initial engagement of these latter.

In the position of the teeth 24 and 26, the force which is applied to the screw 1 and consequently to the valve corresponds to the precalibration stress on the washers 12, to which is added the compressive stress applied to said washers during the displacement of the nut 2 towards the threaded ring 22. The force referred to is in axial equilibrium with the reaction force exerted on the screw 1 by the clamped member, e.g. a valve gate.

The equilibrium of forces thus established is entirely independent of the extraneous frictional torques such as that produced by the nut on the screw and depends solely on the preliminary adjustments of the different members such as the washers 12 and the ring 22. Accordingly, the washers can readily be constituted in such manner that are capable of being subjected to a large number of clamping and releasing operations while retaining constant rigidity. The additional force which moves the nut 2 towards the movable ring 22 can also be regulated by means of a simple action on said ring 22 which is screwed to a greater or lesser extent within the ring 15, thereby determining the distance between the two members and the extent of axial displacement of the nut prior to locking this latter in position.

On the other hand, the axial displacement of the screw has no influence whatever and the clamping stress is the same irrespective of any variations of this displacement.

The releasing of the assembly is obtained by a movement of rotation of the ring 22 in the opposite direction, said ring being actuated by the nut 2 by means of the rod 34, while the spring additionally tends at each moment to return the ring 22 to its rest position and to maintain it therein. While continuing to rotate after the separation of the coupling dogs 24, 26, the rod 34 slackens off the washers 12 which thrust back the nut 2 in the direction of the thrust-bearing 10, then produce the displacement of the screw 1.

This operation can thus be repeated as often as may be necessary without modifying the clamping stress. In fact, there is no frictional torque and neither the variations in coefficient of friction nor extraneous torques are liable to have any influence on the value of stress.

By virtue of two modes of adjustment, namely calibration of the elastic system prior to use and positional variation of the movable ring, an axial-stress limiting device of the type herein described can easily and rapidly be adjusted over a fairly wide range at any moment according to the clamping force which it is desired to apply, and is thus suitable for controlling devices of many different types. A further substantial advantage of the device, especially when it is employed for the purpose of controlling a motor-driven valve, lies in the fact that it prevents any untimely locking of the valve in the closed position by virtue of a positive abutment in rotation whereas, in the usual cases, the inertia of the motor-drive means at the moment of stopping is liable to produce excess clamping pressure.

The limiting device according to the invention can also be easily designed with a high safety factor without requiring very high precision in its manufacture.

A number of different modifications could also be made in the device which has just been described without thereby departing from the scope of the invention.

What I claim is:

1. An axial-stress limiting device for a screw and nut system, comprising: a fixed body; a threaded nut, adapted upon rotation to impart axial movement to a threaded screw, mounted on said body for rotative and limited axial movement relative thereto; resilient means, calibrated to withstand a reaction stress of predetermined value of the nut on its support before yielding, positioned between said nut and said body biasing said nut against said body in one direction of the axis of the threads of said nut; normally disengaged locking means carried by said body and by said nut, said nut being movable axially between its mounting on said body and a locked position, said resilient means biasing the locking means carried by said nut in a direction away from the locking means carried by said body, the locking means carried by said nut and that carried by said body being interengageable upon axial movement of said nut in the other direction of the axis of said threads of the nut, resulting from rotation of said nut relative to said screw and imparting a reaction stress to said nut exceeding said predetermined calibrated value of said resilient means, for locking said nut to said body; and means for rotating said nut, whereby rotation of said nut relative to said screw connected therewith results in movement to said screw in said one direction, in reaction stress of the nut on the support, and when this reaction stress is greater than the calibrated value of said resilient means, in axial movement of said nut in said other direction and engagement of said locking means.

2. An axial-stress limiting device in accordance with claim 1, wherein said locking means comprises an abutment member mounted on said body for limited rotation through a predetermined angle upon engagement with and under the rotative action of said nut.

3. An axial-stress limiting device in accordance with claim 2, wherein said abutment member and said nut are provided with coupling teeth disposed in opposed, axial alignment and interengageable for locking said nut to said abutment member.

4. An axial-stress limiting device in accordance with claim 3, wherein said teeth on said abutment member and on said nut have saw-tooth profile.

5. An axial-stress limiting device in accordance with claim 2, wherein said abutment member includes a coarse-pitch thread and is mounted on said body with said coarse-pitch thread cooperating with a mating coarse-pitch thread, formed on said body, the pitch of said coarse-pitch thread extending in a direction opposite to the pitch of the thread of said nut.

6. An axial-stress limiting device in accordance with claim 2, wherein said abutment member is provided with lug means disposed in annular, elongated slot means formed in said body, the end walls of said slots forming stop means for limiting the angle of rotation of said abutment member.

7. An axial-stress limiting device in accordance with claim 1, wherein said resilient means comprises a plurality of dished spring washers arranged in a stack.

8. An axial-stress limiting device in accordance with claim 2, wherein a resilient member is positioned between said body and said abutment member for rotating said abutment member, when it is not locked to said nut, in a direction opposite to the direction of rotation imparted to said nut which results in interengagement of said locking means.

9. An axial-stress limiting device in accordance with claim 5, wherein said abutment member and said nut are provided with coupling teeth disposed in opposed, axial alignment and interengageable for locking said nut to said abutment member, and a resilient member is positioned between said body and said abutment member for rotating said abutment member, when it is not locked to said nut, in a direction to impart axial movement to said member in a direction away from said nut.

10. An axial-stress limiting device in accordance with claim 9, wherein said abutment member is rotatably adjustable in the coarse-pitch threads of said body for adjusting the position of said abutment member in said body and relative to said nut.

References Cited

UNITED STATES PATENTS

| | | | |
|---|---|---|---|
| 3,294,140 | 12/1966 | Cosenza | 151—69 |
| 2,745,303 | 5/1956 | Cornelius | 85—61 |

EDWARD C. ALLEN, *Primary Examiner.*

CARL W. TOMLIN, *Examiner.*

R. S. BRITTS, *Assistant Examiner.*